(12) United States Patent
Pedersen

(10) Patent No.: US 9,056,643 B2
(45) Date of Patent: Jun. 16, 2015

(54) INDUCTION GENERATOR FOR A BI-CYCLE

(75) Inventor: Troels Pedersen, Nivå (DK)

(73) Assignee: Reelight APS, Viby J (DK)

( * ) Notice: Subject to any disclaimer, the term of this patent is extended or adjusted under 35 U.S.C. 154(b) by 602 days.

(21) Appl. No.: 13/377,014

(22) PCT Filed: Jun. 15, 2010

(86) PCT No.: PCT/DK2010/050140
§ 371 (c)(1),
(2), (4) Date: Mar. 28, 2012

(87) PCT Pub. No.: WO2010/145663
PCT Pub. Date: Dec. 23, 2010

(65) Prior Publication Data
US 2012/0176005 A1    Jul. 12, 2012

(30) Foreign Application Priority Data

| Jun. 15, 2009 | (DK) | 2009 00735 |
| Jun. 15, 2009 | (DK) | 2009 00738 |
| Jun. 22, 2009 | (DK) | 2009 00762 |
| Jun. 25, 2009 | (DK) | 2009 00792 |
| Jul. 12, 2009 | (DK) | 2009 00853 |

(51) Int. Cl.
| H02K 7/00 | (2006.01) |
| B62J 6/06 | (2006.01) |
| B62J 6/20 | (2006.01) |
| H02K 7/18 | (2006.01) |
| H02K 21/02 | (2006.01) |
| H02K 41/03 | (2006.01) |

(52) U.S. Cl.
CPC .... B62J 6/06 (2013.01); B62J 6/20 (2013.01); H02K 7/1846 (2013.01); H02K 7/1869 (2013.01); H02K 21/028 (2013.01); H02K 41/03 (2013.01)

(58) Field of Classification Search
CPC ................ H02K 41/03; H02K 21/028
USPC ................ 310/67 R, 67 A, 75 C
See application file for complete search history.

(56) References Cited

U.S. PATENT DOCUMENTS

| 5,590,946 A * | 1/1997 | Jung | 362/475 |
| 7,023,122 B2 * | 4/2006 | Gang | 310/181 |
| 2010/0264781 A1 * | 10/2010 | Pedersen | 310/67 R |

FOREIGN PATENT DOCUMENTS

| GB | 2 397 698 A | 7/2004 |
| WO | WO 01/33700 A1 | 5/2001 |
| WO | WO 2005/075284 A2 | 8/2005 |
| WO | WO 2009/015910 A1 | 2/2009 |

OTHER PUBLICATIONS

"Tumbling magnet creates extra power" Eureka, Findlay Publications Ltd., Mar. 2004, p. 16, XP-001047719, vol. 24, No. 3.

* cited by examiner

*Primary Examiner* — Hanh Nguyen
(74) *Attorney, Agent, or Firm* — Knobbe Martens Olson & Bear LLP

(57) ABSTRACT

The invention provides a generator for a bicycle. The generator has one or more driving magnets fixed to a wheel of the bicycle and an induction structure that is fixed to a frame part of the bicycle. The induction structure comprises an induction magnet and a coil. A fixture allows fixing of the driving magnets at locations where they, during operation of the bicycle, repeatedly moves towards and away from the induction magnet. The generator comprises means for reorienting the induction magnet so that it is optimally oriented when a driving magnet approaches. Such means comprises a first driving magnet or a structure of magnetisable material which is magnetisable by the driving magnet.

19 Claims, 13 Drawing Sheets

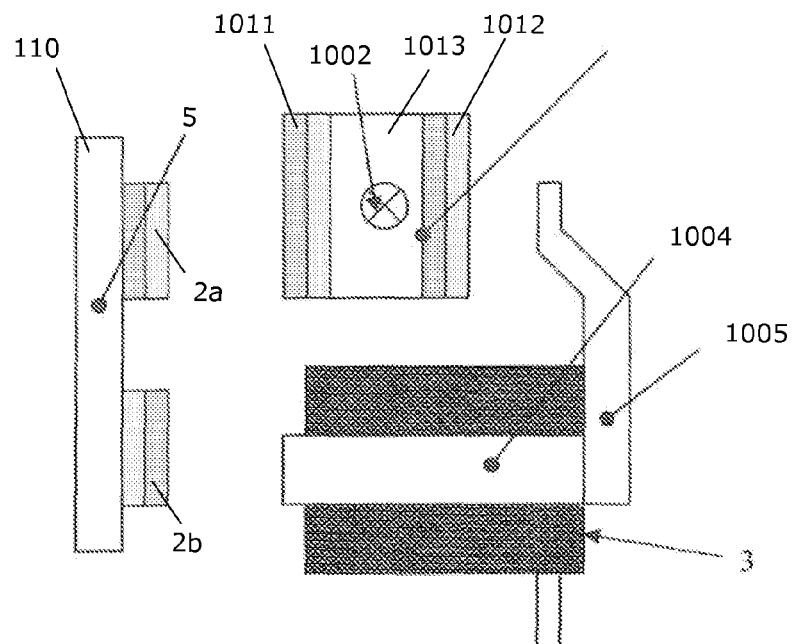
Fig. 10A
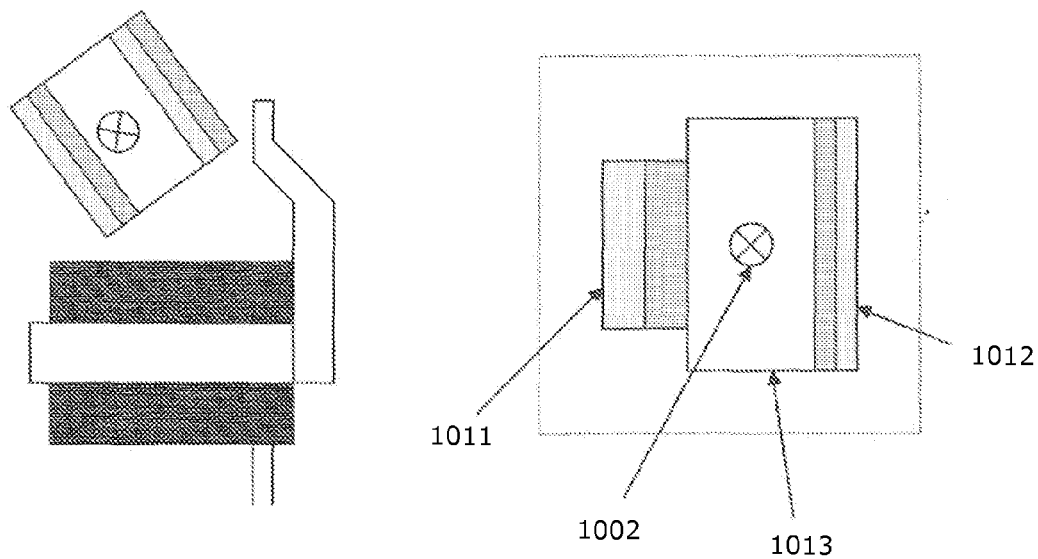
Fig. 10B
Fig. 10C

INDUCTION GENERATOR FOR A BI-CYCLE

CROSS REFERENCE TO RELATED APPLICATIONS

This application claims the benefit and priority to and is a U.S. National Phase Application of PCT International Application Number PCT/DK2010/050140, filed on Jun. 15, 2010, designating the United States of America and published in the English language, which is an International Application of and claims the benefit of priority to Danish Patent Application No. PA 2009 00735, filed on Jun. 15, 2009, Danish Patent Application No. PA 2009 00738, filed on Jun. 15, 2009, Danish Patent Application No. PA 2009 00762, filed on Jun. 22, 2009, Danish Patent Application No. PA 2009 00792, filed on Jun. 25, 2009 and Danish Patent Application No. PA 2009 00853, filed on Jul. 12, 2009. The disclosures of the above-referenced applications are hereby expressly incorporated by reference in their entireties.

FIELD OF THE INVENTION

The invention relates to an induction generator, in particular to an induction generator for vehicles such as bi-cycles.

BACKGROUND OF THE INVENTION

Generators or dynamos used for bicycles are well known. Several different variants of generators exist, ranging from very simple dynamos where a multiple pole permanent magnet is rotated relative to a single coil via a small wheel in frictional engagement with the rim of the tire of the bicycle. Other types of generators are based on magnets which are attached directly to the wheel or tire and which induces a current in a coil which is attached to the frame of the bicycle. Yet another type of generator is based on simple multiple pole generators which are arranged in the hub of the front wheel.

WO 2009015910 discloses a generator for a bicycle. The generator has a driving magnet fixed to a wheel of the bicycle and an induction structure which is fixed to the frame of the bicycle. The induction structure comprises an induction magnet which is movably fixed to a coil. A fixture allows fixing of the magnets at locations where they, during normal operation of the bicycle, repeatedly moves towards and away from each other so that the driving magnet moves the induction magnet relative to the coil. To provide a generator which can potentially deliver a uniform output which is less dependent on a very specific installation of the generator, on the bicycle and which may therefore be easy to install, the generator further comprises a resetting magnet which provides positioning of the induction magnet relative to the coil when the driving magnet moves away from the induction magnet.

Whereas WO2009015910 shows improvements in comparison with known generators for bi-cycles, the use of a resetting magnet has some problems. For example, the strength of the resetting magnet has to be chosen carefully. That is, if it is too strong it may hinder efficient movement of the induction magnet, and if it is too weak it may not be able to position the induction magnet. Furthermore, since the air gap between the driving magnet and the induction magnet may depend on a particular generator installation so that the magnetic force provided by a driving magnet is not accurately known, the correct choice of the strength of the reset magnet may be further complicated.

Furthermore, the resetting magnet may disturb the magnetic flux generated by the induction magnet and thereby reduce the amplitude of current induced in the coil by the induction magnet.

Due to these problems the inventor of the present invention has appreciated that an improved induction generator is of benefit, and has in consequence devised the present invention.

SUMMARY OF THE INVENTION

It would be advantageous to achieve improvements for induction generators. In particular, it may be seen as an object of the present invention to provide a generator design that offers improved capabilities of power generation, or other problems, of the prior art.

To better address one or more of these concerns, in a first aspect of the invention an induction generator for a vehicle for generating electric current is presented, where the generator comprises first and second parts attachable to vehicle-parts, one of the vehicle-parts being moveably, e.g. rotatably, fixed relative to the other, where the first part comprises first and second driving poles of opposite magnetic polarities, the second part comprises an induction magnet with first and second induction poles of opposite magnetic polarities and a coil with windings of electrically conducting wire, where the induction magnet is moveably, e.g. rotatably, arranged relative to the coil to enable induction of a current in the coil by motion of the magnetic poles, the first part is arranged on the moveable vehicle-part to enable the first and second poles of the first part to alternately face the induction magnet, upon motion of the vehicle-part, so as to move the induction magnet by magnetic interaction between the poles of the first part and the induction magnet, and where the first pole of the first part is provided at least to position or move the induction magnet before the second pole of the first part approaches the induction magnet.

Since the induction generator does not use a stationary resetting magnet as described in WO2009015910 the generator according to the invention does not have the problems associated with WO2009015910, i.e. the first driving pole which has the corresponding function of a resetting magnet does not need to have a particular magnetic strength in order to ensure that the second driving pole is able to move the induction magnet. Furthermore, the first driving pole does not disturb the magnetic flux towards the coil which is generated by the induction magnet and consequently, the first driving pole does not reduce the efficiency of the generator.

A second aspect of the invention relates to an induction generator for a vehicle for generating electric current, the generator comprises first and second parts attachable to vehicle-parts, one of the vehicle-parts being moveably, e.g. rotatably, fixed relative to the other, where the first part comprises at least a first driving pole, the second part comprises an induction magnet with first and second poles of opposite magnetic polarities, a coil with windings of electrically conducting wire and a magnetic conducting structure arranged to be magnetised by the at least first driving pole upon passage of the first driving pole, where the induction magnet is moveably, e.g. rotatably, arranged relative to the coil to enable induction of a current in the coil by motion of the magnetic poles, the first part is arranged on the moveable vehicle-part to enable the at least first pole to face the induction magnet, upon motion of the vehicle-part, so as to move the induction magnet by magnetic interaction between the poles of the first part and the induction magnet, and where the magnetised magnetic conducting structure enables positioning or movement of the induction magnet in dependence of the magnetic field provided by the magnetic conducting structure.

The generator according to the second aspect is similar to the generator of the first aspect. However, instead of using a driving pole for positioning of the induction magnet, a magnetic conducting structure is used to position the induction magnet when the first part is moving away from the induction magnet.

Since the magnetic conducting structure is magnetised by the first driving pole, which may be the sole driving pole, the magnetic conducting structure acts in instead of the first driving pole to position the induction magnet when the first driving pole is moving away from the induction magnet.

The magnetic conducting structure may be arranged to guide the magnetic flux from the induction magnet to the coil.

Since the induction generator does not use a stationary resetting magnet as described in WO2009015910 the generator according to the invention does not have the problems associated with WO2009015910.

In an embodiment according to the first aspect the first driving pole of the first part is provided at least to move the induction towards a position so that the second driving pole and the pole of the induction magnet, closest to the first part, have the same polarities when the second pole approaches the induction magnet.

Thus, the first pole of the first part is provided at least to position the induction magnet so that a pole of the induction magnet has the same polarity as the facing second driving pole of the first part when the second driving pole approaches the induction magnet, i.e. before the second driving pole has caused a rotation of the induction magnet.

In an embodiment the induction magnet is rotatably arranged, and the north and south poles of the induction magnet are angularly separated so that an approach of the second driving pole towards a pole of induction magnet will cause an angular rotation, by the angular separation or more, to a pole of opposite polarity of the induction magnet. For example, the poles may be angularly separated by 180 degrees. The induction magnet may also have four poles, i.e. two north and two south poles, where the angular separation between poles is 45 degrees. It is also possible that the angular separations measured in clockwise and counter clockwise direction are different. E.g. two poles may be separated by 270 degrees in a clockwise direction and 90 degrees in a counter clockwise direction. Further, the angular separation between poles may vary along the circumference.

In an embodiment the magnetic strength of the first driving pole is smaller than the strength of second pole. This may be advantageous if the main purpose of the first driving pole is to position the induction magnet in a favourable position in order for the second driving pole to generate maximum rotation of the induction magnet.

In an embodiment the rotation axis of the rotatable vehicle-part is perpendicular or substantially perpendicular to rotation axis of the induction magnet, and the rotation axis of the induction magnet deviates by an angle α relative to a plane perpendicular to the rotation axis of the rotatable vehicle-part.

In an embodiment the arc length between geometric centres of the first and second driving poles of the first part is equal to, or substantially equal to the arc length between magnetic centres of two poles of the induction magnet, so that motion of the first and second driving poles by an arc length cause angular motion of the induction magnet by the same or substantially the same arc length measured between magnetic centres of two poles of the induction magnet. By matching the distances between driving poles and induction poles it is possible to obtain a gearing between travelling distance of the driving poles and the arc length between induction magnets, e.g. a gearing of one-to-one, two-to-one or one-to-two or other gearing of any other ratio. Thereby, it is possible to control the angular rotation of the induction magnet relative to the driving poles so as to obtain an optimal synchronisation and, thereby, optimal magnetic induction in the coil.

In an embodiment according to the second aspect, the magnetic conductive element has one or more extremities which are positioned relative to the induction magnet to enable a magnetically polarised pole of one of the extremities to attract a pole of the induction magnet of opposite magnetic polarisation. Since the magnetic conductive element can be magnetised temporally, e.g. by the magnetic field of a driving pole or magnet, the extremities function as magnetic poles for positioning of the induction magnet.

In an embodiment the magnetic conductive element is arranged to guide a magnetic flux from the induction magnet to the coil. Accordingly, the magnetic conductive element may function both as a positioning means for the induction magnet and for guiding flux from the induction magnet towards the coil.

In an embodiment the coil is wound on a part of the magnetic conductive element to ensure an effective current induction in the coil.

In an embodiment the induction magnet is rotatably hinged and the hinge axis is displaced from a symmetry axis of the induction magnet. Advantageously, an asymmetrically hinged induction magnet may establish a preferred orientation of the induction magnet. The displacement of the symmetry axis may be measured relative to the centre of mass of the magnetic centre of the induction magnet.

In an embodiment the first part comprises at least three driving poles arranged with alternating magnetic polarities, where the distance between magnetic centres of adjacent driving poles is non-constant.

A third aspect of the invention relates to a bi-cycle comprising an induction generator according to the first or second aspect.

A fourth aspect of the invention relates to a method for generating electric current using an induction generator for a vehicle, the generator comprises first and second parts attachable to vehicle-parts, one of the vehicle-parts being moveably, e.g. rotatably, fixed relative to the other, where the first part comprises first and second driving poles of opposite magnetic polarities, and the second part comprises an induction magnet with first and second poles of opposite magnetic polarities and a coil with windings of electrically conducting wire, where the induction magnet is moveably, e.g. rotatably, arranged relative to the coil to enable induction of a current in the coil by motion of the magnetic poles, the method comprising fixing the first part on the moveable vehicle-part to enable the first and second poles of the first part to alternately face the induction magnet, upon motion of the vehicle-part, so that the first pole of the first part is able to at least position or move the induction magnet before the second pole of the first part approaches the induction magnet, and fixing the second part on the non-moveable vehicle-part so that the induction magnet can be moved by magnetic interaction between the poles of the first part and the induction magnet.

A fifth aspect of the invention relates to a method for generating electric current using an induction generator for a vehicle, the generator comprises first and second parts attachable to vehicle-parts, one of the vehicle-parts being moveably, e.g. rotatably, fixed relative to the other, where the first part comprises at least a first driving pole, the second part comprises an induction magnet with first and second poles of opposite magnetic polarities, a coil with windings of electrically conducting wire and a magnetic conducting structure arranged to be magnetised by the at least first driving pole upon passage of the first driving pole, where the induction magnet is moveably, e.g. rotatably, arranged relative to the coil to enable induction of a current in the coil by motion of the magnetic poles, the method comprising fixing the first part on the moveable vehicle-part to enable the first pole of the first part to face the induction magnet, upon motion of the vehicle-part, and fixing the second part on the non-moveable vehicle-part so that the induction magnet can be moved by magnetic interaction between the pole of the first part and the poles of the induction magnet, and where the magnetised magnetic conducting structure enables positioning or movement of the induction magnet in dependence of the magnetic field provided by the magnetic conducting structure.

In summary the invention relates to a generator for a bicycle. The generator has one or more driving magnets fixed to a wheel of the bicycle and an induction structure that is fixed to a frame part of the bicycle. The induction structure comprises an induction magnet and a coil. A fixture allows fixing of the driving magnets at locations where they, during operation of the bicycle, repeatedly moves towards and away from the induction magnet. The generator comprises means for re-orienting the induction magnet so that it is optimally oriented when a driving magnet approaches. Such means comprises a first driving magnet or a structure of magnetisable material which is magnetisable by the driving magnet.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 10A-C shows an asymmetrically hinged induction magnet.

DESCRIPTION OF AN EMBODIMENT

Figure 1:
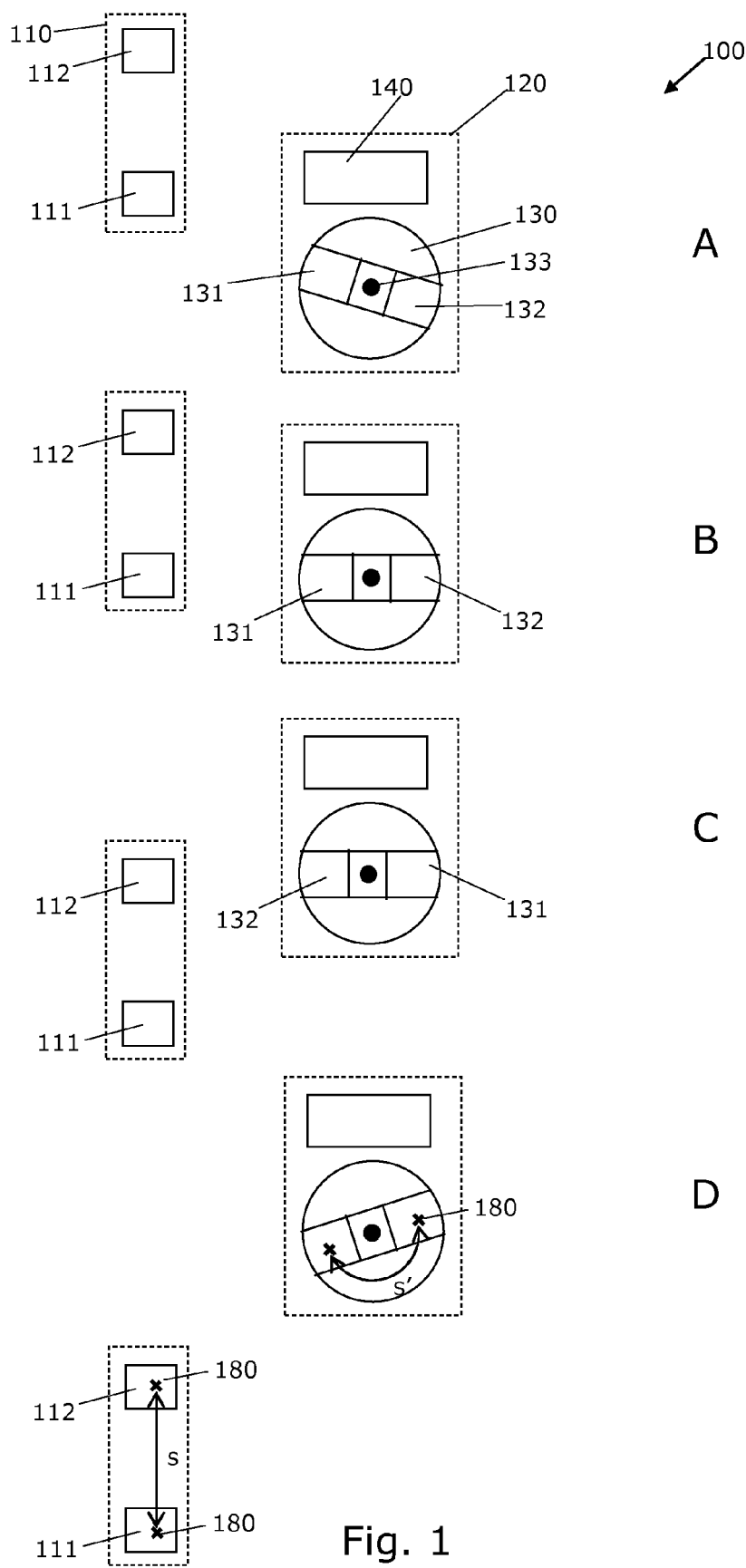
FIG. 1A-D illustrates resetting of the induction magnet using a driving pole.

FIG. 1A shows an induction generator 100 for a vehicle for generating electric current. The generator comprises first and second parts 110,120 where the first part is normally mounted on a moveable part of the vehicle and the second part 120 is normally mounted on a stationary part of the vehicle.

The first part 110 comprises first and second magnetic poles 111, 112 of opposite magnetic polarities, e.g. the first pole may be a north pole and the second pole may be a south pole.

The second part 120 comprises an induction magnet 130 with first and second magnetic poles 131,132 of opposite magnetic polarities and a coil 140.

The coil may be a solenoid or other coil with windings of electrically conducting wire arranged to be subjected to the magnetic field of the induction magnet 130 so as to generate an electric current. The electric current may supplied via output wires of the coil to a lamp of the vehicle or other electrical consumers.

The induction magnet may be rotatably arranged relative to the coil. As illustrated the induction magnet may be rotatably hinged via an axis 133. However, generally, the induction magnet may be moveably arranged, e.g. slideably arranged on a guide and/or spring biased to enable a reciprocal back and forth motion.

The motion or rotation of the induction magnet relative to the coil 140 generates variations in direction and strength of the magnetic field generated by poles 131, 132. The magnetic variations induce an induction current in the coil 140.

The first part is suited to be mounted on a moveable part of the vehicle, e.g. a part that reciprocates back and forth or rotates relative to a stationary part of the vehicle onto which the second part is mounted.

Accordingly, the first part may be arranged on the movable vehicle-part to enable the first and second poles 111,112 of the first part 110 to alternately face the induction magnet 130, upon motion of the vehicle-part and, thereby, cause the induction magnet 130 to move due to magnetic interaction between the poles 111,112,131,132 of the first part and the induction magnet.

FIG. 1A shows a situation where the first pole 111 of the first part 110 is approaching the induction magnet 130. In this situation the induction magnet may be oriented arbitrarily, i.e. the position of the first and second poles 131, 132 relative to the poles 111,112 of the first 110 is not known.

During the period when the first driving pole 111 approaches the induction magnet 130 the first driving pole 111 will affect the position of the induction magnet due to magnetic interaction between poles 111,112,131,132 so that when the first driving pole 111 faces the first induction pole 131, the induction magnet have moved or rotated so that the first driving pole and the facing pole of the induction magnet 130 have opposite polarities. This is illustrated in FIG. 1B.

For instance if the first induction pole 131 is closest to the first driving pole 111 and the induction pole 131 and the first driving pole 111 have opposite magnetic polarities, then the induction magnet 130 will rotate so that the induction pole 131 will face the first driving pole 111 of opposite polarity. Accordingly, it may happen that the induction magnet 130 only rotates a few degrees and, consequently, the magnetic field from the induction magnet changes only little and only little current will be induced in the coil 140. Oppositely, if a pole 131,132 of opposite polarity corresponding to the polarity of the first driving pole 111 was positioned farthest away from the first driving pole, then the approaching movement of the first part 110 would cause the induction magnet 130 to rotate approximately 180 degrees so that the magnetic field from the induction magnet would change maximally and consequently a maximal current will be induced in the coil 140.

Due to the uncertainty of the position of the induction magnet 130 is it not guaranteed that a maximum amount of current will be generate during passage of the first driving magnet.

However, since the first driving pole 111 has positioned the induction magnet 130 in a predetermined position when the driving pole 11 moves away from the induction magnet 130, it is guaranteed that the first induction pole 131 which is closest to the first part 110 will have a magnetic polarity equal to the polarity of the second driving magnet 132 since the first and second driving magnets have opposite polarities. Thereby, it is guaranteed that the induction magnet will rotate maximally, e.g. 180 degrees, when the second driving pole 112 approaches the induction magnet. Accordingly, as shown in FIG. 1C, if the first induction pole 131 was facing the first driving pole 111 when they were adjacent, then the induction magnet will be rotated so that the second induction pole 132 will face the second driving pole 112 when the second driving pole 112 and the second induction pole 132 are adjacent.

Thus, whereas the amount of electric energy generated by passage of the first driving pole 111 may be uncertain, the passage of the first driving pole 111 provides a positioning of the induction magnet to a most favourable position, i.e. a position resetting, so that a maximum of electric energy will be generated by passage of the second driving pole 112.

Accordingly, the first pole 111 of the first part 110 is provided at least to position or move the induction magnet 130 before the second pole 112 of the first part approaches the induction magnet. That is, the induction magnet should be moved by the first driving pole 111 so that the second driving pole 112 and the induction pole 131,132 which is closest to the first part 110 have the same polarities when the second driving pole 112 approaches the induction magnet so as to enable a maximum rotation of the induction magnet by attracting the pole 131,132 which is farthest away from the first part 110. Therefore, the first pole may be thought of as a reset pole. However, the first pole 111 also contributes with generation of electrical energy by causing a rotation of the induction magnet 130 and, thereby, magnetic induction.

FIG. 1D shows the situation where the second driving pole 112 moves away from the induction magnet 130. Due to magnetic attraction forces and the kinetic energy of the induction magnet, the induction magnet may rotate an amount.

In the embodiment shown in FIG. 1A the north and south poles 131,132 of the induction magnet are angularly separated by 180 degrees so that an approach of the second driving pole 112 towards a pole of induction magnet 130 with the same polarity as the second driving pole will cause an angular rotation, at least by the angular separation of 180 degrees, to a pole of opposite polarity of the induction magnet. Whereas the second driving pole 112 will initially cause a rotation of 180 degrees of the induction magnet by attraction of the oppositely polarised induction pole, the induction magnet may continue to rotate and induce current when the second driving pole 112 moves away from the induction magnet due to the kinetic energy of the induction magnet.

In order to ensure that the first driving pole 111 performs a correct reset positioning of the induction magnet, i.e. so that an induction pole with the opposite polarity as the first driving pole 111 is positioned close to the second driving pole 112 when it approaches, the magnetic strength of the first driving pole 111 may advantageously be selected to be smaller than the magnetic strength of the second driving pole 112. Thus, the magnetic strength of the first driving pole 111 may be selected so that it large enough to attract an oppositely polarised pole located farthest possibly away from the first driving pole, and so that it is small enough not to generate a too high rotation speed or kinetic energy of the induction magnet 130. That is, if the rotation speed or kinetic energy of the induction magnet 130 is too large, the induction magnet may continue to rotate when the first driving pole moves away and the attraction force becomes too small to maintain the position of the induction magnet. For example, the magnetic strength of the second driving pole 112 may be a factor of 2, 5, or 10 times larger than the magnetic strength of the first driving pole 111.

The first and second poles 111, 112 of the first part may be the north and south poles of a single magnet, or each or the first and second poles may be constituted by a pole of a single magnet. Accordingly, the first and second poles 111,112 may equivalently be first and second magnets which are oriented so that opposite poles faces the second part 120. For example, the first driving pole 111 may be a first driving magnet 111 with a magnetic strength which is smaller than magnetic strength of a second driving magnet 112 which constitutes the second driving pole 112.

It may be an advantage that the first driving pole not only positions the induction magnet, but also brings the induction magnet into rotation, so that passage of the second driving magnet may create a larger rotation speed of the induction magnet—and thereby larger energy production—as compared to the situation where the induction magnet is not rotating when the second driving pole approaches. This may require that the distance between the first and second driving poles has a certain value.

In an embodiment, in order to ensure that the poles of the induction magnet 130 are optimally positioned relative to the second driving pole 112 the arc length s between geometric centres 180 of the first and second driving poles 111,112 (see FIG. 2) is adapted to the arc length s' between magnetic centres 180 of the induction poles 131, 132. For example the arc lengths s and s' may be selected to be equal or substantially equal, so that passage of the first and second driving poles 111,112, which a separated by an arc length s, causes rotation of the induction magnet by the same or substantially the same arc length s' measured between magnetic centres 180. In this way a synchronisation or gearing between the driving poles 111,112, and the induction poles 131,132 is obtained, where the gearing ration is substantially given by the ratio s/s'. When the induction magnet 140 is formed as a cylinder as shown, the arc length s between magnetic centres of driving poles may be selected to be equal to half of the circumference of the cylinder, or equal to the diameter of the cylinder of induction magnets.

Figure 12:
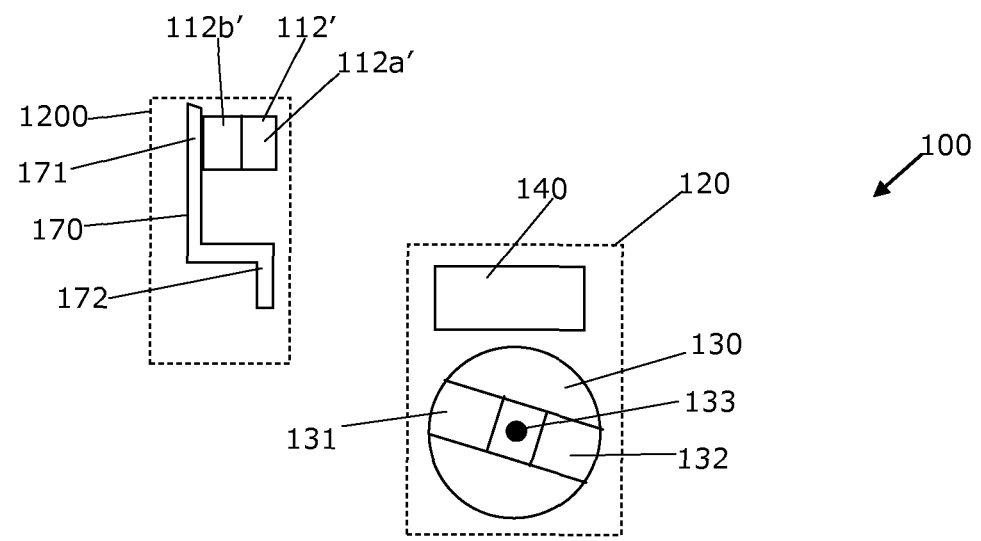
FIG. 12 shows an embodiment of the first part where a magnetised magnetically conducting structure has a reset function.

FIG. 12 shows an alternative embodiment of the first part 1200. The first part 1200 comprises a driving magnet 112' with first and second poles 112a', 112b' of opposite magnetic polarities, and a magnetically conducting structure 170 with a first extremity 171 connected to the second pole 112b' and a second extremity 172 directed towards the second part 120. Since the magnetically conducting structure is magnetiseable, the permanent magnet 112' will magnetise the structure 170 so that the first extremity 171 will be magnetised as a pole having the opposite polarity as the second pole 112b and the second extremity 172 will be magnetised as a pole having the same polarity as the second pole 112b and, therefore, the opposite pole as the first driving pole 112a'. Accordingly, the magnetic properties of the first part 1200 of FIG. 12 is equivalent to the first part 110 of FIG. 1 since, the magnetic polarity of the second extremity 172 is opposite to the magnetic polarity of the pole 112a' of the driving magnet 112'. Effectively, the second extremity is equivalent to the first driving pole 111. Therefore, the second extremity 172 will position the induction magnet 130 when it approaches equivalently to the first driving pole 111, and the driving magnet 112' will cause a rotation of the induction magnet 130 of at least 180 degrees, equivalently to the second driving pole 112. It is understood that the first part 1200 should be oriented relative to the second part 120 so that the second extremity approaches the second part 120 before the driving magnet 112'.

FIG. 13A-C shows an embodiment where the first part 110 only comprises one driving magnet 111. Except for the magnetically conducting structure 190, the second part 1300 is equivalent to the second part 120. The magnetically conducting structure 190 comprises a first extremity 191 facing the induction magnet 130 and a second extremity 192 facing driving magnet 111—when it passes the second part 1300. The magnetically conducting structure may be made of a soft magnetic material which is capable of being magnetised temporarily, i.e. in the absence of any permanent magnets the soft magnetic material maintains its magnetic polarisation temporarily.

In FIG. 13A the driving magnet 111 approaches the induction magnet 130 of the second part 1300. The induction magnet 130 is oriented so that a facing induction pole 131 has the same polarity as the approaching driving pole or magnet 111. In FIG. 13B the driving magnet 111 has caused the induction magnet 130 to rotate 180 degrees by attracting the opposite induction pole 131 having the opposite polarisation as the driving pole 111. The induction magnet 130 may continue to rotate when the driving magnet 111 moves away from the induction magnet. In FIG. 13C the driving pole is facing the first extremity 191 of the magnetically conducting structure. Accordingly, similarly to the principle of the first part 1200, the first extremity 191 will be magnetised to have a magnetic pole of opposite polarity as the driving pole 111 and the second extremity 192 will be magnetised to have a magnetic pole of the same polarity as the driving pole 111. Accordingly, the second extremity will cause the induction magnet 130 to position with an orientation determined by the polarity of the second extremity 192, so that an induction pole 132 with the opposite polarity as the second extremity 192 will face the second extremity 192. Since the second extremity 192 has the same magnetic polarity as the driving pole 111, the polarities of the induction pole 131 which will face the driving pole 111 when it approaches again and the driving pole 111 will be equal.

Accordingly, the second extremity 192 which is magnetised by the driving pole 111 provides positioning of the induction magnet, equivalently to the driving pole 111 and the second extremity 172, with the difference that the second extremity 192 is stationary relative to the induction magnet and the stationary extremity 192 provides positioning of the induction magnet subsequently to the passage of the driving pole 111.

Figure 13:
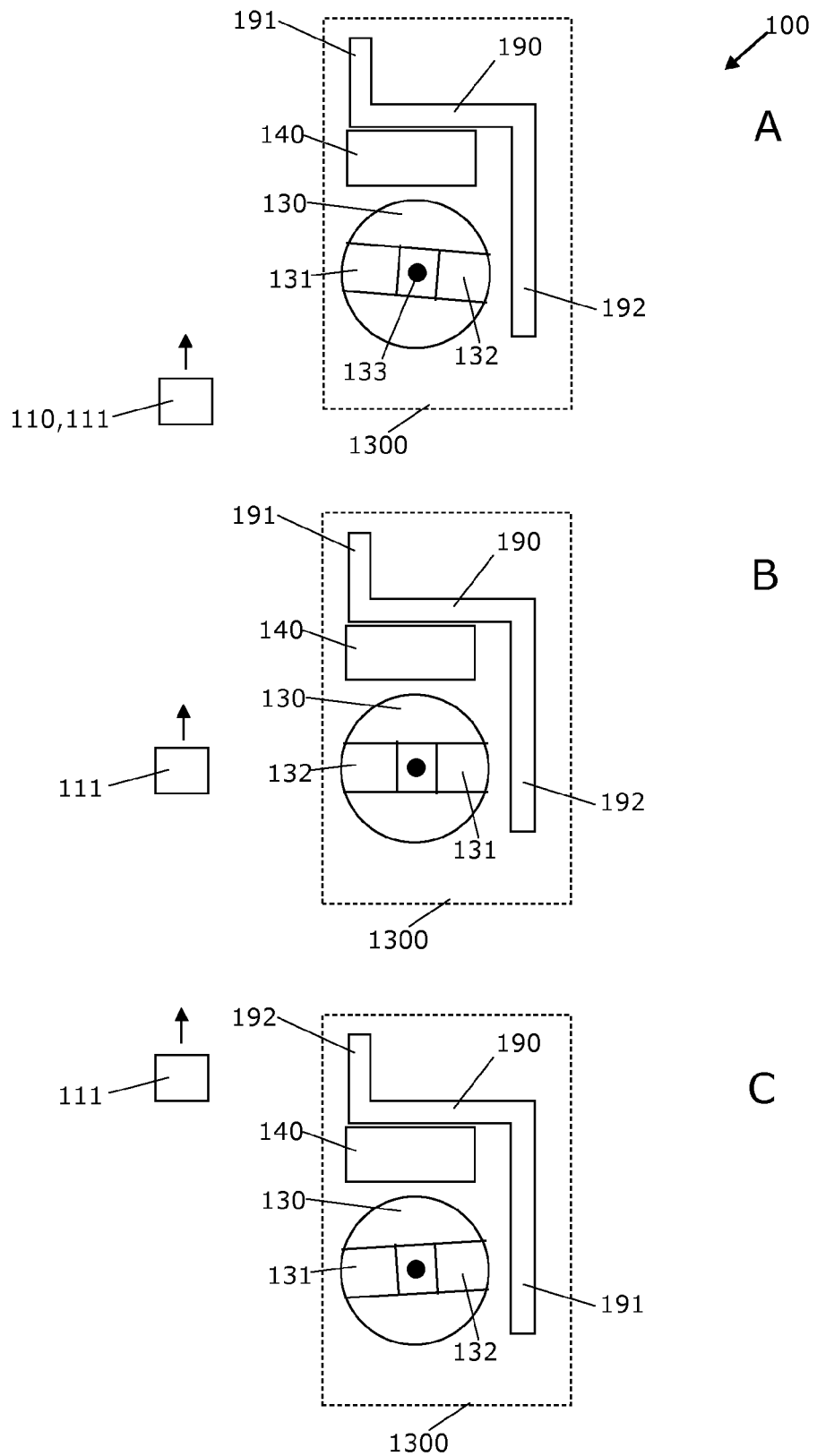
FIG. 13A-C shows an embodiment of the stationary second part where a magnetised magnetically conducting structure has a reset function.

Whereas reference has been made to a driving pole 111 in FIG. 13, it is understood that the driving pole 111 is one pole of a magnet with two poles which is faces the second part upon passage.

Figure 2:
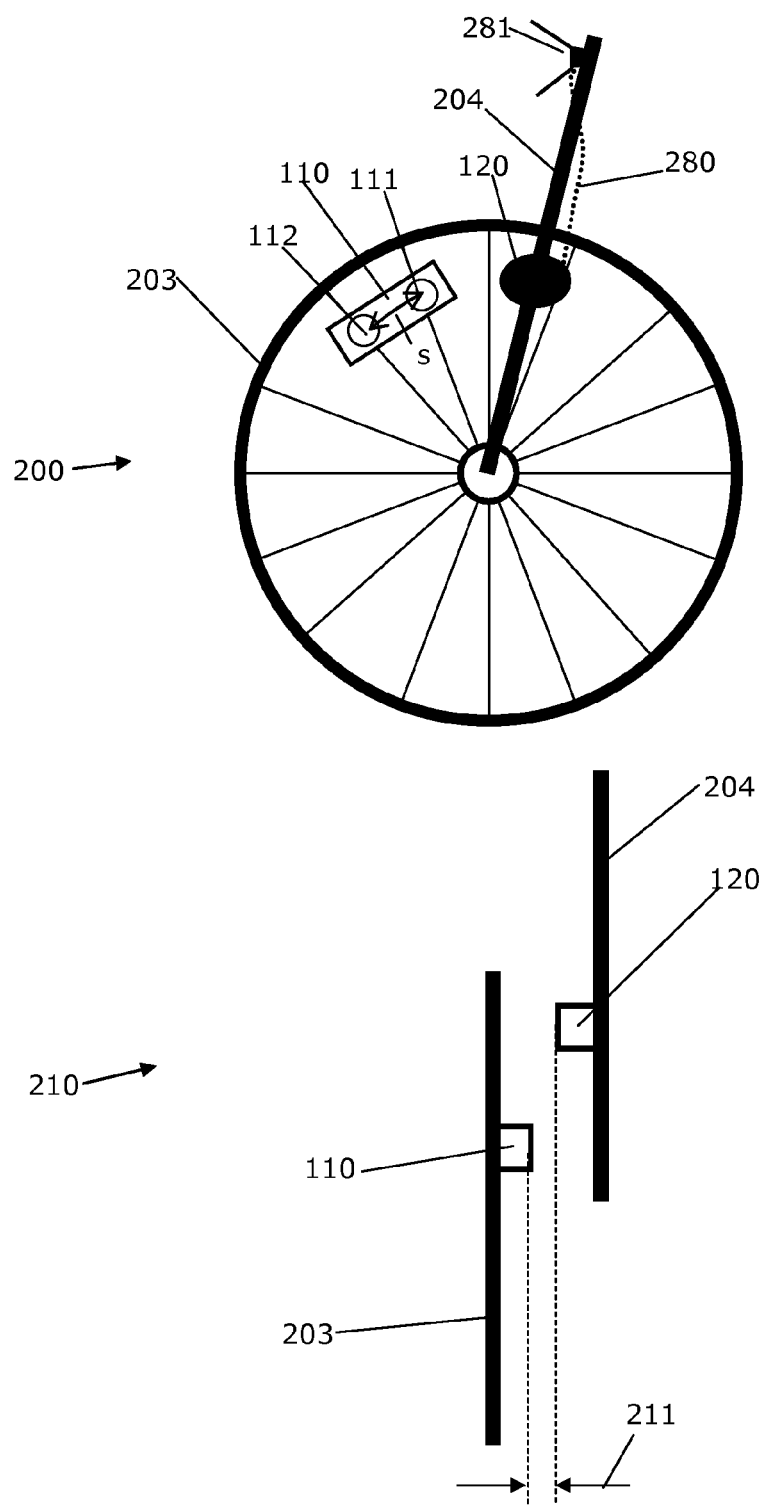
FIG. 2 shows how the generator may be attached to bicycle components.

FIG. 2 shows a side view 200 of a bicycle where the first part 110 of the generator 100 is mounted on a first vehicle part 203, e.g. the spokes of a wheel 203 and the second part 120 is mounted on a second vehicle part 204, e.g. on the front fork 204. When the wheel 203 rotates, the driving poles 111,112 of the first part 110 will repeatedly pass the induction magnet 130 of the second part 120 so that a current is repeatedly generated in the coil 140. The current from the coil may power a lamp 281 via connected to the coil 140 via a wire 280. The lamp 281 could also be integrated with a housing which houses the coil and the induction magnet. The induction current may also be used to power a bi-cycle computer, a data transmitter, a data receiver, or a sensor, e.g. for sensing speed of the bicycle.

The first and second part 110,120 may be attachable to the vehicle-parts 203, 204 via first and second fixing structures (not shown) such as conventional mounting means, e.g. metal fittings. The vehicle part 203, 204 may be provided with one or more first parts and possibly also one or more second parts.

FIG. 2 also shows a front view 210 which shows that the first part 110 and the second part 120 are mechanically separated by a distance 211. Thus, since the first part is not mechanically connected with the second part, any frictional losses between the two generator parts 210,220 are eliminated.

It is understood that alternatively the second part 120 may be mounted on the wheel 203 and the first part 110 may be mounted on the fork 204, so the movement of the first part relative to the second part generates an electric current in the coil. Thus, it is clear that the relative motion of the first part 110 and the second part 120 generates electric current, whether the first part 110 or the second part 120 is mounted on a rotatable vehicle-part.

In the following different embodiments of the invention will be described in more detail.

First Detailed Description of an Embodiment

Figure 3A:
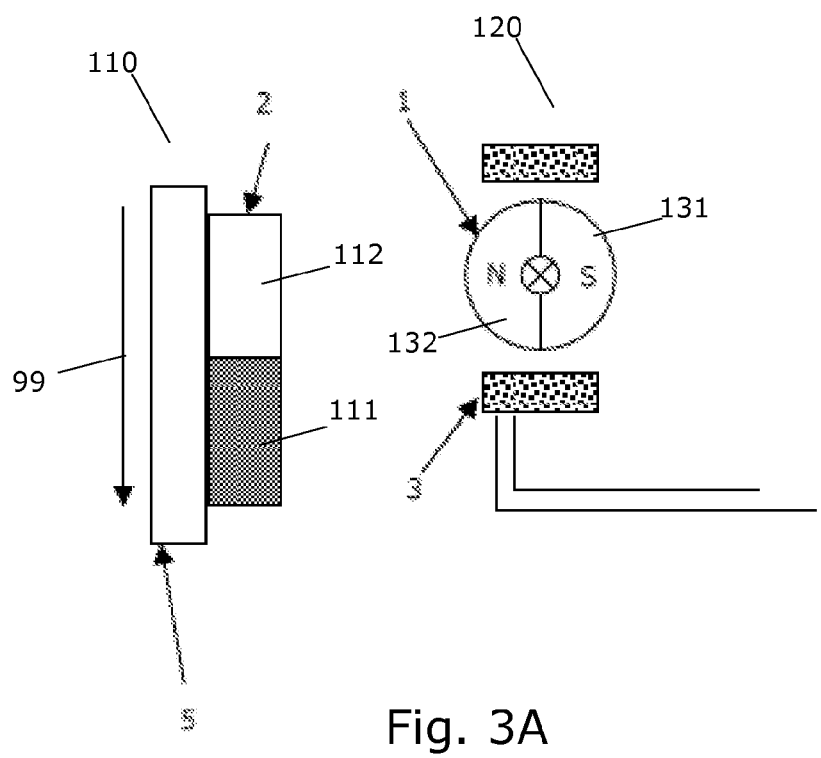
FIG. 3A-B show an embodiment of the generator with and without an magnetically conducting structure for guiding flux and/or positioning of the induction magnet.

FIG. 3A shows an embodiment of the invention. An induction magnet 1 is fixed rotationally to an induction structure not illustrated. The induction structure also comprises a coil 3 that is preferably wound around the induction magnet so that the induction magnet may still rotate freely. A driving magnet 2 is attached to a driving structure, not shown. The magnet may in one embodiment be attached to a magnetic conductive element 5 which is fixed to the driving structure. The driving magnet 2 comprises first and second driving poles 111, 112 or magnets 111, 112.

The magnets of the first part 110 and induction magnet 1,130 are preferably permanent, e.g. made from neodymium, but could also be electromagnetic. The driving magnet 2 is oriented in a way so that one of magnetic poles 111,112 having north and south polarities will pass the induction magnet 1 before the other pole passes. In this way, the first magnet or pole 111 will help orienting the induction magnet 1 so it has the preferred orientation before the next magnetic pole 112 of the driving magnet passes, and force the induction magnet to flip, e.g. rotate 180 degrees, and by that create a huge induction current in the coil 3.

The induction magnet may comprise two magnetic elements arranged on opposite sides of a core of a magnetically conductive material. This provides a larger induction magnet with a larger magnetic strength by use of smaller permanent magnets.

Figure 3B:
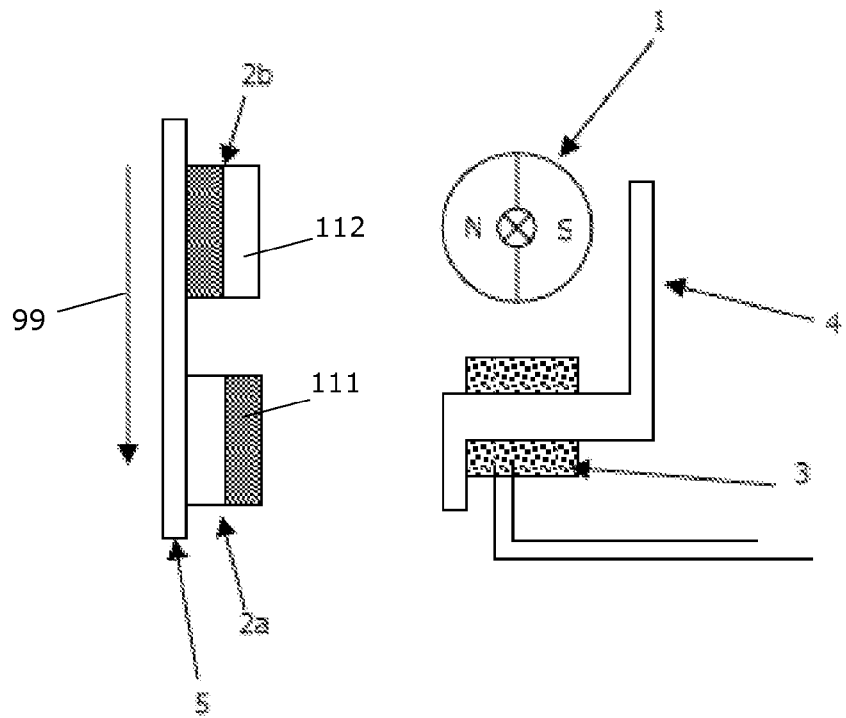

FIG. 3B shows another embodiment of the invention where the coil 3 is no longer wound around the induction magnet, but preferably around a magnetic conductive element 4 that help guiding the magnetic flux in the system. Further the embodiment shows a driving magnet with two magnetic poles 111,112 facing the induction magnet, but which magnetic poles are created by two individual magnets 2a and 2b. The magnets 2a and 2b may additionally be attached to a magnetic conductive element 5 in order to increase the magnetic strength of these magnets. As the magnet 2a pass the induction magnet the magnetic pole 111 of magnet 2a will reset or position the induction magnet, before the subsequent second magnetic pole 112 of magnet 2b passes.

Figure 4A:
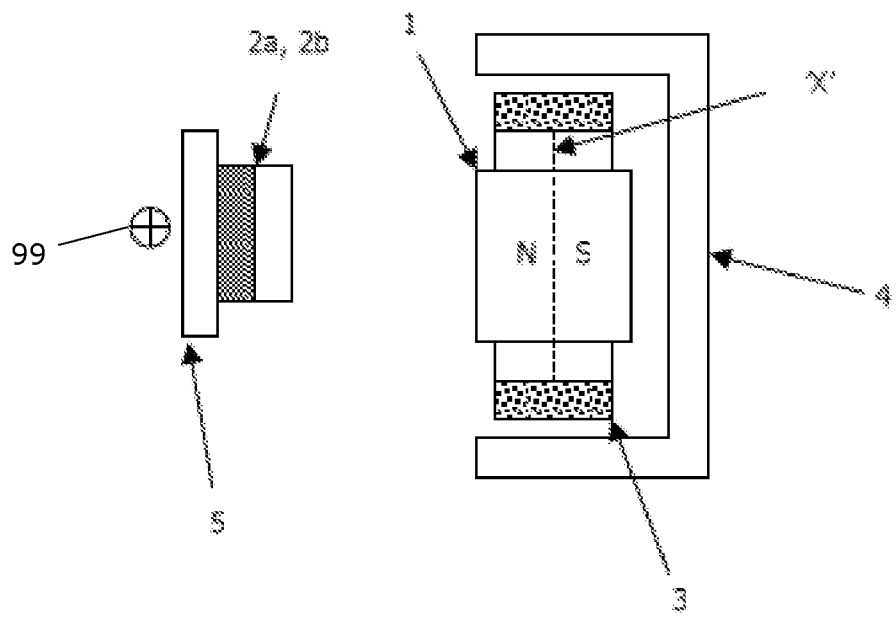
FIG. 4A-B show different driving directions of the driving poles and different hinge axis of the induction magnet.

FIG. 4A illustrates another embodiment of the invention. The coil 3 is wound around the induction magnet, and a magnetic conductive bracket 4 is placed in the induction structure creating a magnetic flux guide. The magnetic conductive element may be placed as shown with extensions reaching towards the driving magnets 2a, 2b, but placed in each end of the rotation axis X' of the induction magnet.

In the embodiments the direction of movement of the driving magnets 2a, 2b are indicated with direction 99.

Figure 4B:
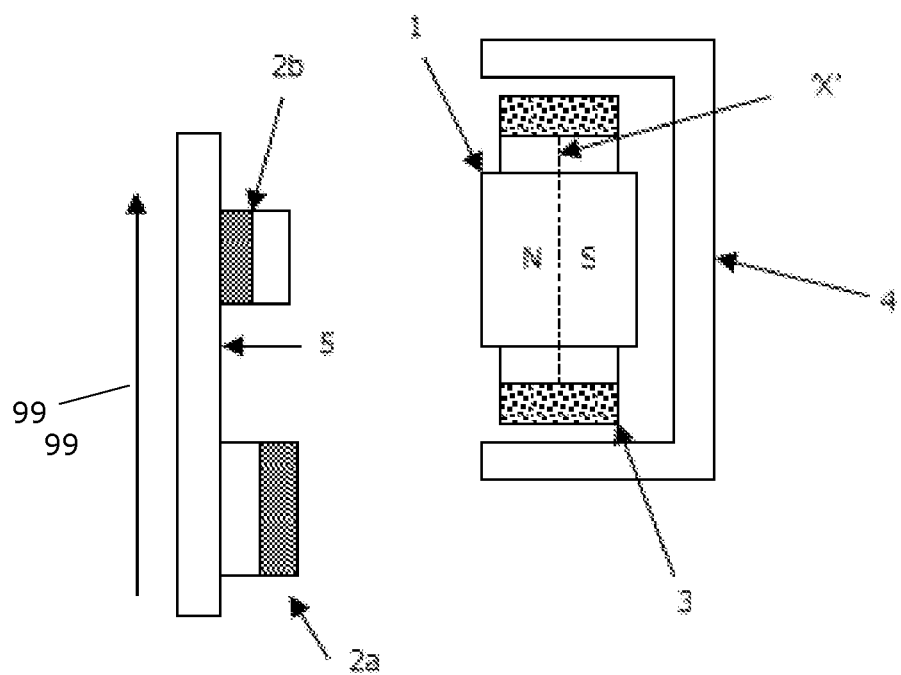

FIG. 4B illustrates the same embodiment as shown in FIG. 4A, but in this embodiment the driving magnets 2a, 2b pass the induction magnet 1 in an angle 90 degrees compared to the embodiment in FIG. 4A. That is, in FIG. 4B the rotation axis X' of the induction magnet 1 is parallel with or tangent to moving direction of the driving magnets 2a, 2b, whereas in FIGS. 3A, 3B and 3A, the rotation axis X' is perpendicular to moving direction of the driving magnets. There is a huge difference in the way the induction magnet reacts on the driving magnet depending on the direction of passage. Thus, in FIG. 4B where the axis of rotation of the induction magnet is parallel or approximately oriented parallel with the direction of movement of the driving magnet the induction magnet will flip more instantly as the resetting magnet 2a of the driving magnet passes. Most importantly, after resetting, the passage of the second magnetic pole 2b of the driving magnet will cause a very sudden flip of the induction magnet 1. The drawback of this in comparison with the system shown in FIGS. 3A, 3B and 4A is that at high speeds the induction magnet may not get to move at all because of the short time of passage of the driving magnet. Further, FIG. 4B illustrates that the resetting magnet (here magnet 2b) of the driving magnet may be smaller or weaker than that used to create the second magnetic pole (here magnet 2a).

The rotation axis X' of the induction magnet preferably lies in the same plane as the plane of motion of the driving magnets. But in some applications an angling of the X' axis in comparison with the plane of motion of the driving magnet may be desirable.

Figure 5:
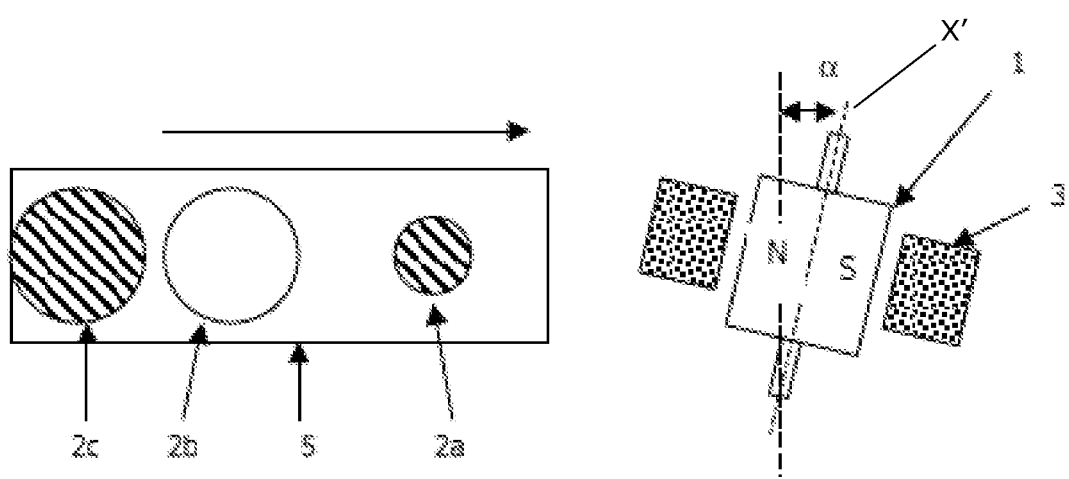
FIG. 5 shows how the induction magnet may be inclined relative to a normal or parallel direction relative to the driving direction of the driving poles.

FIG. 5 shows an embodiment where the rotation axis X' of the induction magnet has an angle α compared to the direction of movement of the driving magnets. Further, FIG. 5 shows three driving magnet poles made by 3 individual magnets 2a, 2b and 2c. Any number of driving poles or driving magnets may be used and comprised by a first part 110, for example a single reset magnet 2a,111 and a plurality of driving magnets 2b,2c,112, where the reset magnet has a lower magnetic strength than the driving magnets. The angular deviation α of the rotation axis of the induction magnet 1 may be measured relative to the plane of motion of the driving magnets 2a, 2b or relative to the normal to the tangent of the motion path of the driving magnets. Thus, the axis of rotation of the induction magnet may be angled and not just perpendicular or parallel with the direction of movement of the driving magnets, to improve the dynamics of the system and changing the resonance characteristics of the system. The angular deviation α may also be advantageous for resetting the induction magnet in a given position.

In general the system could have more than one coil 3, and the coil could be made of copper or aluminium or the coil could be made directly on a printed circuit, such as a flex print or similar.

The driving magnets 2, 2a-c as well as the induction magnet 1 can be constituted by one single magnet, or a plurality of magnets, where some may be attached to each other or attached to magnetic conductive elements in order to create a magnet with desirable magnetic properties.

The induction generator 100 may comprise a plurality of coils 3,140 and a plurality of induction magnets 1,130, e.g. one coil for each induction magnet.

A coil 3,140 may the wound around the induction magnet 1,130 in a way that enables motion of the induction magnet, but the coil can also be wound around a magnetic conductive element 4 to decrease the inner resistance of the coil for improving the performance further.

The magnetic conductive elements 4 and 5 may be made of any kind of magnetic conductive material or compound, e.g. steel, PERMENORM 5000, ferrite or iron-powder dispersed in a polymer. Generally, the use of such magnetic conductive elements may increase the magnetic strength of driving magnets 2a,2b,211,212, induction magnets 1,131,132 and increase the strength and guiding of magnetic flux guided to the coil 3,140. Thus, the use of magnetic conductive elements 4,5 advantageously minimises the consumption of magnetic material used for the driving magnets and the induction magnets.

The first part or driving fixture 110 with driving magnets 2a,2b,111,112 may be fixed to one or more of the spokes of a bicycle wheel by use of a metal or plastic fitting. Alternatively the driving magnets may be adhesively fixed to the tire. In an embodiment, the driving magnets are attached to the bicycle by use of a fitting made of a magnetically conductive material since this may increase the strength of the magnetic field.

Two or more driving magnets 2a,2b may be attached to a magnetic conductive element 5 which is then attached to the wheel with fittings. In this way the rotation of the inductive magnet is controlled more precise as the distance between the driving magnets is determined by the fixing element 5.

The induction structure 120 may be fixed to the frame of a bi-cycle by use of a metal or plastic fitting.

The first part 110 may also be mounted on one of the crank shafts or at a location on one of the pedals, or on other moving part of the bi-cycle.

The induction magnet 1,130 is preferably rotationally hinged relative to the coil 3,140 so that the induction of a current occurs under rotational movement of the induction magnet relative to the coil. By suitable dimensioning and suspension of the induction magnet relative to the coil, it may be facilitated that the induction magnet moves freely without interference from obstacles during the rotation relative to the coil. This facilitates a silent generator and less wear.

In one embodiment, the induction structure 120 comprises a housing forming a sealed chamber which houses the coil, the induction magnet, and optionally also the magnetic conductive element. The chamber may be filled with an anticorrosive, e.g. a thin liquid solution, e.g. oil.

The magnetic conductive element 4 may be a separate element that is attachable to the bicycle near the induction structure at a location whereby the flux increases or flux control is achieved. It may, for simplicity in the assembly procedure, be an advantage to either fix the magnetic conductive element directly to the induction structure or to provide the magnetic conductive element as a part of the induction structure, i.e. movably fixed to the induction magnet—e.g. as mentioned already by providing the magnetic conductive element in the same chamber of a joint housing. This also provides a uniform distance and thus a uniform flip back force between the induction magnet and magnetic conductive element.

The induction magnet may be arranged to rotate around an axis which extends radially away from the corona of the magnetic flux, or the induction magnet may generate a magnetic flux which is essentially symmetric about a centre plane, and wherein the induction magnet is arranged to rotate around an axis which is perpendicular to the centre plane.

Embodiments Include:

A bicycle generator comprising:
an induction magnet 1 fixed rotationally to an induction structure,
a driving magnet 2 fixed to a driving structure having a first and a second magnetic pole arranged to pass the induction magnet in a row during movement,
a coil 3 fixed to the induction structure, where
the first magnetic pole is used to reset the induction magnet, before the second magnetic pole passes the induction magnet.

A bicycle generator characterized in that the induction magnet is rotating parallel with an axis that has an angle α or is parallel or almost parallel with the direction of movement of the driving magnet.

A bicycle generator characterized in that the angle α can be anything from 0 degrees to 90 degrees in the plane of movement of the driving magnet.

A bicycle generator characterized in that the angle α can be anything from 0 degrees to 90 degrees in a plane perpendicular to the plane of movement of the driving magnet.

A bicycle generator characterized in that the magnetic poles of the driving magnet are many e.g. 10 created by one large permanent magnet having sectional magnetic areas.

A bicycle generator having a fixed bearing that allows the induction magnet 1 to rotate, which bearing is integrated in the induction magnet or the induction structure, being a gliding bearing or a roller bearing or even a magnetic bearing.

An induction structure for a bicycle generator having mounting features that allows the structure to be mounted on e.g. the frame of a bicycle, as well as providing a closed chamber for the induction magnet filled or partly filled with lubrication oil.

Second Detailed Description of an Embodiment

Figure 6A:
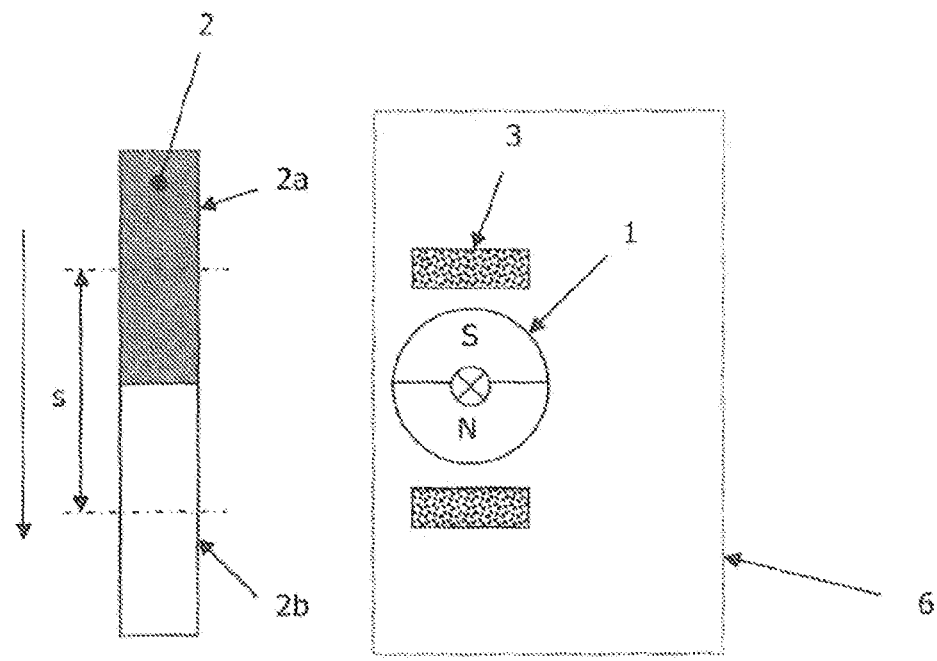
FIG. 6A-B shows use of an arc shaped magnetically conducting structure located in the vicinity of the coil and the induction magnet.

FIG. 6A illustrates an embodiment of the generator 100. An induction structure 6), i.e. the second part 120, comprises a rotational moveable induction magnet 1 and a coil 3. Induction takes place whenever the induction magnet 1 is rotated. The driving magnet 2 is arranged to move relatively to the induction structure 6.

As the two magnetic poles 2a, 2b passes the induction structure in vicinity the induction magnet 2 will turn to positions most favourable to the magnetic potential of the system. In practice the induction magnet 1 will turn approximately 180 degrees as the driving magnet 2 passes. This will create an induction current in the coil 3. The magnetic poles 2a+2b) are positioned with a distance s when measured from the middle of the magnetic surface facing the induction structure.

If s is smaller than half of the circumference of a circle encircling the induction magnet 1, the speed of rotation of the induction magnet 1 is increased when compared to a solution similar to a simple magnetic gear, where the magnetic poles of the driving magnet is positioned with a distance similar or equal to half the circumference of the circle of encircling of the induction magnet. This would be similar to a generator type where the induction magnet 1 is rolling on the surface of the tire or rim with the same speed as the magnet, i.e. the tangential velocities on the periphery of the tire and the rolling induction magnet are the same. When the distance s is made shorter a higher gear ratio can be obtained even with inductive magnets with a large diameter. This boost the overall power output of the coil 3 significantly. Whenever the distance s becomes too small there is a tendency that the system becomes sensitive to the size of air gap 211 (FIG. 2). If s is equal to, or almost equal to, the diameter of the circle encircling the induction magnet the highest speed of the induction magnet is reached at moderate speeds of the driving magnet and moderate size of air gap 211 between the driving magnet and the induction magnet.

Figure 6B:
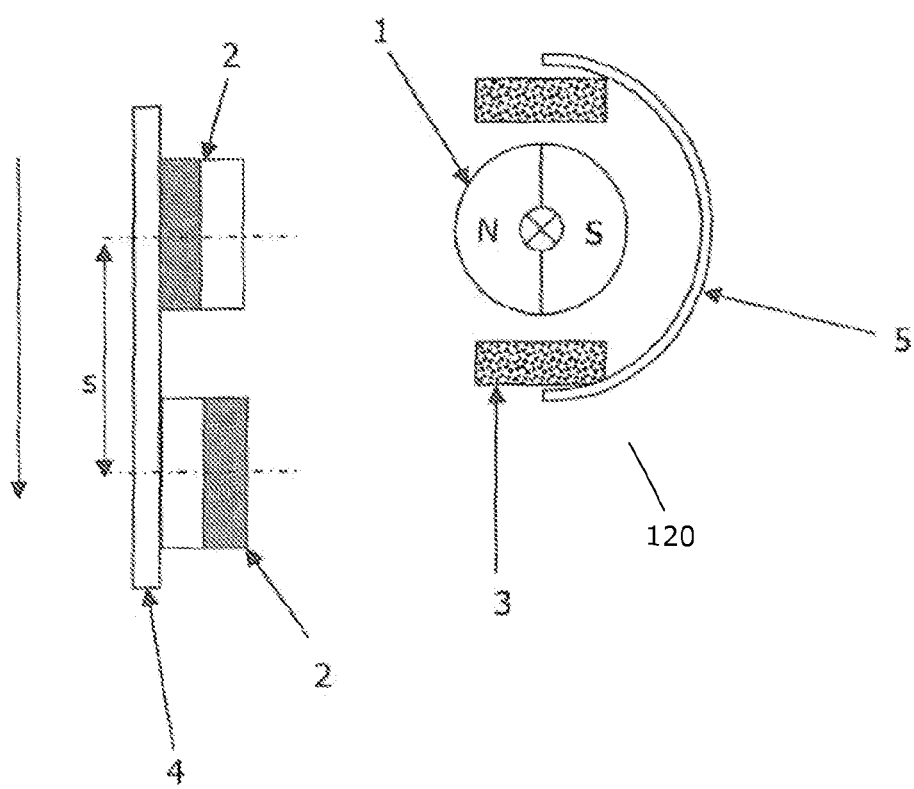

FIG. 6B illustrates another embodiment of the invention where the induction structure 120 further comprises an arc-shaped magnetic conductive bracket 5 which helps to increase the overall magnetic flux for in the coil 3).

Figure 7A:
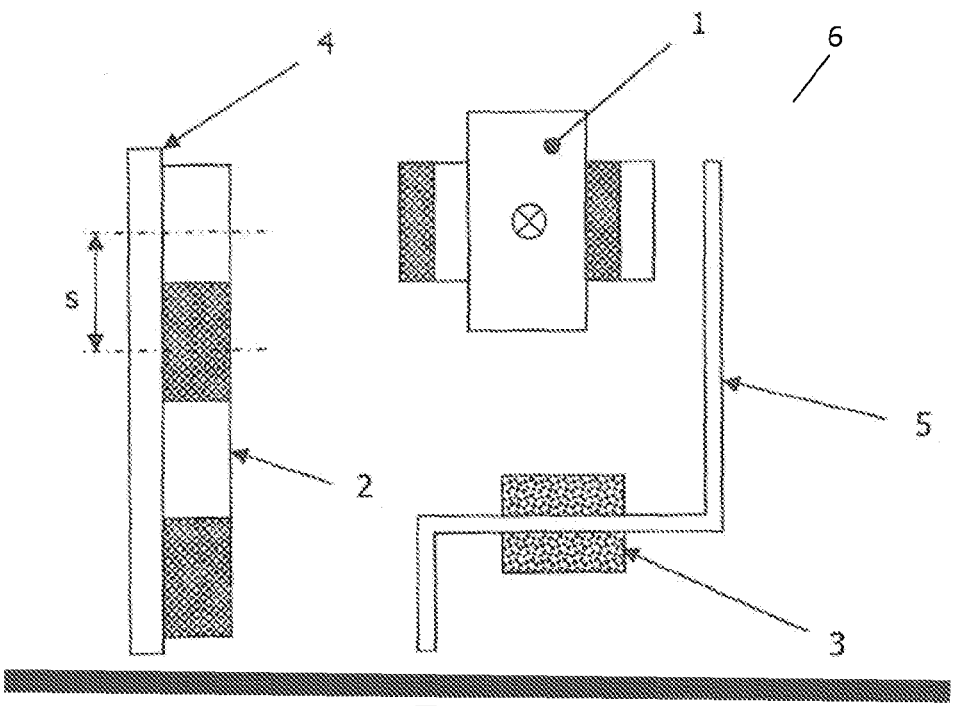
FIG. 7A-B shows a driving structure comprising more than two driving poles.

FIG. 7A illustrates other embodiment of the invention where the driving magnet 2 is replaced with e.g. ring or disc-shaped magnet 2 with numerous magnetic poles facing the induction structure 6. At least two driving magnetic poles of the driving magnet 2 are positioned with a distance s when measured from the middle of the magnet poles (e.g. the centre of the surface taking the median in two directions). The ring magnet 2 is e.g. attached to a magnetic conductive element 4 which helps increasing the strength of the magnetic field towards the induction structure 6. The induction structure is illustrated comprising an induction magnet 1 that consists of two permanent magnets attached to a magnetic conductive element in the middle. The conductive element 5 guides the magnetic field through the coil 3 wound around the magnetic conductive element 5.

Figure 7B:
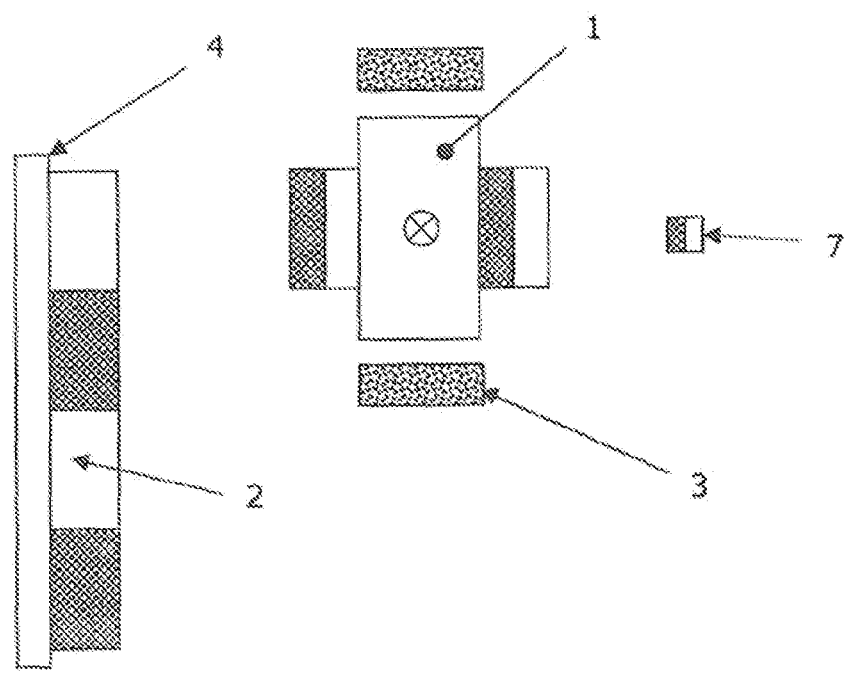

FIG. 7B shows the same driving magnet as in FIG. 7A, but this time it is together with a type of generator using a stationary resetting magnet 7. This extra resetting magnet 7 is used to secure that the induction magnet 1 is left in a favourable position when the driving magnet has passed—e.g. as the driving magnet is representing only an arc of the circle running by, the stationary reset magnet 7 may ensure that the induction magnet 1 is positioned correctly.

Any number, e.g. two, three or four, of driving magnets 2 may be used to drive each induction magnet. The plurality of driving magnets may be arranged in clusters suited to be fixed to the wheel of a bicycle.

WO 2009/015910 discloses a generator where a stationary permanent magnet is used as a resetting magnet. This resetting magnet ensures that the induction magnet always returns to a desirable position after passing of the driving magnet. The position is determined by the position of the resetting magnet and the magnetic direction of the resetting magnet. This ensures according to the invention that there are no 'dead zones' where induction is limited at certain speeds due to resonance phenomenon.

However, the use of such a stationary reset magnet has some disadvantages. One is that driving magnet forces always has to be stronger than the magnetic forces from the resetting magnet. Otherwise the driving magnet will not be able to make the induction magnet shift position during passage. Another issue is that the system will perform very dependently on the size of the air gap 211. The problem arises as a very small gap of air will make the induction magnet switch position very early as the driving magnet approaches. Then there will be a longer pause where the induction magnet is not moved as the driving magnet passes. When the driving magnet has passed the induction magnet and is far enough away to be overruled by magnetic forces from the resetting magnet 7, the induction magnet will switch back. The length of the pause will influence the induction power negatively. A longer pause will decrease the overall output of the induction magnet. Accordingly, this system has an undesirable dependency between the size of the air gap and the power output of the induction structure.

The present embodiment may solve this problem of the dependency of the air gap on the generator efficiency, by setting a distance s between driving poles 2a,2b,211,212 of the first part 110 in correlation with the arc length s' between magnetic centers 180 to ensures that the movement—e.g. rotation of the induction magnet—is more controlled. Having two magnetic poles 2a+2b with a fixed distance s) the induction magnet will rotate at almost the same speed—no matter the size of the air gap 211, since a geared relationship between the speed of the driving poles and the rotation speed of the induction magnet is obtained.

Third Detailed Description of an Embodiment

Figure 8A:
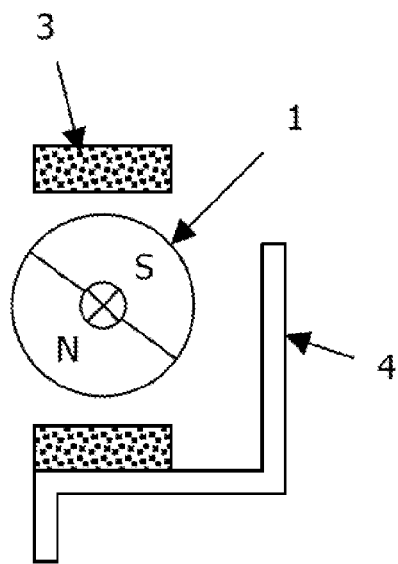
FIG. 8A-B shows a magnetically conducting structure for positioning of the induction magnet.
Figure 8B:
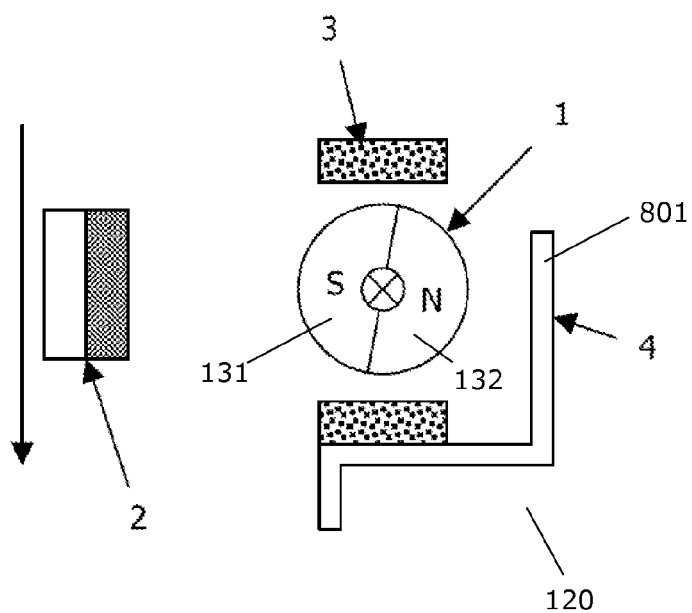

FIGS. 8A and 8B shows a generator 100 which comprises a magnetic conductive element 4 which provides positioning of the induction magnet 1 relative to the coil 3 when the driving magnet 2 moves away from the induction magnet. The magnetic conductive element is not a permanent magnet but a soft magnetic material as the remarens (remaining magnetic force) of the magnetic conductive element is substantially lower than that of e.g. a permanent magnet.

During operation, the driving magnet 2 will move towards, and pass the induction magnet 1, preferably in close vicinity. During this movement, the magnetic field between the driving magnet and the induction magnet becomes sufficiently strong to interfere with the balance of the induction magnet and the magnetic conductive element 4. The induction magnet is therefore moved relative to the coil. By this movement, the coil is influenced by the magnetic field from the induction magnet, and a current is induced.

When the driving magnet 2 has passed the induction structure 120 and moves in a direction away from the induction magnet, the opposite occurs. At a certain distance, the magnetic field between the driving magnet and the induction magnet becomes insufficiently strong to maintain the position of the induction magnet, and the forces from the magnetic interaction between the induction magnet and the magnetic conductive element 4 moves the induction magnet back to one of one or more reset positions, i.e. the position of the induction magnet will be determined by the interaction between the induction magnet and the magnetic properties of the magnetic conducting structure, where the magnetic properties of the magnetic conducting structure was previously effected by the magnetic field of the driving magnet 2. During this re-positioning movement of the induction magnet, a current is once again induced in the coil. The reset positions are mainly determined by the geometry of the magnetic conducting structure. Thus, the extremity 801 shown in FIG. 8B provides a natural reset position for the induction magnet. That is, in the absence of other magnetic fields one of the poles of the induction magnet 1,130 will be attracted by an oppositely magnetised pole of the extremity 801, where the magnetic polarisation of the extremity is determined by the previous passage of the driving magnet 2. In this way, the induction magnet can be positioned by the magnetic conducting structure, so that a subsequent passage of the driving magnet will cause a maximum rotation of the induction magnet. That is, the induction magnet may be reset by the magnetic conducting structure so that the magnetic polarisation of the induction pole 131 facing the driving pole 2,111 has the same polarisation as the driving pole 2,111 when the driving pole 2,111 approaches the induction magnet. Whereas the magnetic conducting structure of FIG. 8B only has one extremity or pole 801, the structure may be provided with a plurality of extremities, e.g. two or three, where each of them may provide a reset position for the induction magnet.

It may be an advantage to use the magnetic conducting structure 4 for positioning of the induction magnet, e.g. in comparison with using a stationary reset magnet 7 (FIG. 7B) which may interfere with the magnetic field from the induction magnet. That is, the magnetic conducting structure 4 does not interfere with the magnetic field from the induction magnet, but may instead guide the magnetic flux from the induction magnet to the coil. For example the coil 3 may be wound upon a part of the magnetic conducting structure.

Further it may be possible to design the magnetic conductive element 4 in a way that enables operation of the system so that the driving magnet will be able to rotate the induction magnet despite a substantial size of the air gap 211. This is mainly due to the fact that the magnetic conductive element is a soft magnetic material, so that the driving magnet may polarize the magnetic conductive element as it passes this, which can be utilized to control the induction magnet.

It is possible to design the magnetic conductive element to ensure a very well defined position of the induction magnet—after passage of the driving magnet—again due to the utilization of the soft magnetic properties which enables the passing driving magnet to polarize the magnetic conductive element.

In addition it is possible to use different kinds of driving magnets as there is no resetting magnet defining a polarization. Thus two driving magnets with opposite polarization can be used instead of driving magnets all with the same orientation.

Additionally, the use of a magnetic conductive element helps to increase the overall magnetic flux going through the coil. Instead of counteracting the induction magnet flux the magnetic conducting element increases the overall magnetic flux going through the coil.

The magnetic conductive element 4 may be a separate element that is attachable to the bicycle near the induction structure 120 at a location ensuring that the mentioned flip back function of the induction magnet 1 is achieved. It may, for simplicity in the assembly procedure, be an advantage to either fix the magnetic conductive element directly to the induction structure or to provide the magnetic conductive element as a part of the induction structure, i.e. movably fixed to the induction magnet—e.g. as mentioned already by providing the magnetic conductive element in the same chamber of a joint housing. This also provides a uniform distance and thus a uniform flip back force between the induction magnet and magnetic conductive element.

The magnetic conductive element 4 may be designed so that a plurality of preferred reset positions are created, e.g. by providing the magnetic conductive element with a plurality of poles or extremities located near the induction magnet, e.g. surrounding the induction magnet. As an example this may be utilised to obtain different operation of the induction magnet when driving magnets pass so the induction magnet will perform differently depending upon different driving magnets, i.e. which are oriented differently or have different magnetic strength.

As the driving magnet 2 passes the induction magnet (see. FIG. 8B), the driving magnet will interact with both the magnetic conductive element 4 and the induction magnet 1. Thus, the induction magnet will flip from the original position it had when the driving magnet was far away, to a new position determined by the magnetic forces acting between all three elements; the driving magnet, the induction magnet and the magnetic conductive element 4.

The magnetic conductive element 4 can be designed so as to both maximise the magnetic flux through the coil, and to provide the reset function.

Figure 9A:
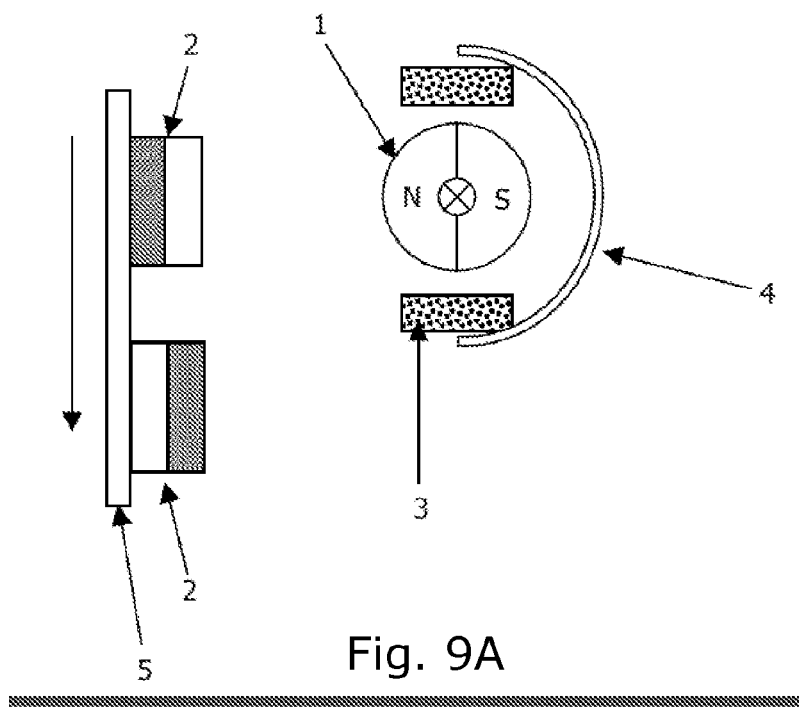
FIG. 9A-B shows a magnetically conducting structure for positioning of the induction magnet in combination with a plurality of driving poles.

FIG. 9A shows another design of the magnetic conductive element. The design of the magnetic conductive element can be arc shaped in any desirable way, to exactly get the function of resetting and conduction wanted. This may also involve that the magnetic conductive element 4 is cut into or e.g. made as a wire net to minimise eddy currents during fast movement of the induction magnet 1.

The magnetic conductive element 4 can be made of any type of material showing soft magnetic properties, e.g. mild steel, alloys used in transformers or different compounds such as iron powder held into form by a resin such as Epoxy or thermoplastic as PP or PE.

Figure 9B:
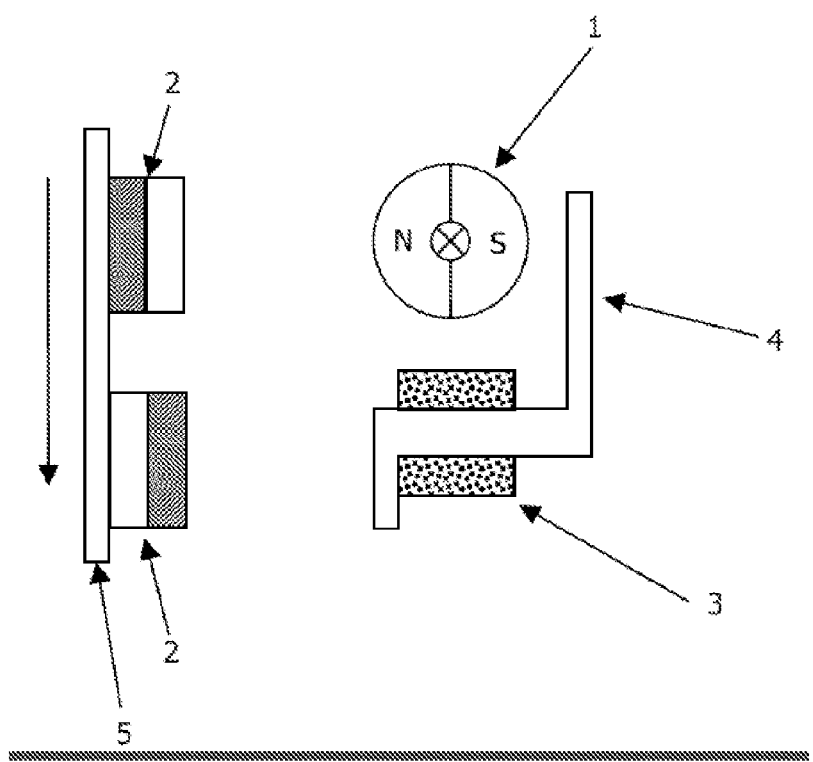

FIG. 9B shows another embodiment where two driving magnets are used, both attached to a magnetic conductive back part 5. As the two magnets are positioned with opposite direction of their magnetic poles, they will, during passage force the induction magnet to rotate very fast and precise. During this operation the magnetic conductive element 4 will work as a magnetic flux guide, and having the coil 3 wound around the magnetic conductive element 4, this will make a very compact and high power generator.

One advantage coming from having the coil wound around the magnetic conductive element 4 is that this element can be made of materials (e.g. VACUFLUX 50) that enables a much higher flux density than that of the induction magnet. Thus the area needed to handle a certain magnetic flux can be less, and by that the coil can be wound with less inner resistance giving a higher output.

It is also possible to use the coil 3 as a reset function, as current may be introduced to the coil, giving the magnetic conductive element 4 an magnetic polarization, forcing the induction magnet to rotate into a preferred position (orientation of poles). The current may than be disconnected to the coil, and the induction magnet will find its final position due to the interaction between the induction magnet 1 and the magnetic conductive element 4. In other words, an amount of the induced current or electric power may be used to ensure that the induction magnet 1 take a preferred position by supplying the coil 3 with some of the induced current, e.g. previously induced current so that the coil generates an electric field. When and how much current that needs to be supplied to the coil may be determined by electronics such as a processor.

In general, the magnetic conductive element 4 determines a finite number of possible rest positions of the induction magnet 1, whenever the driving magnet 2 is so far away that the magnetic influence from the driving magnet is negligible.

Accordingly, the magnetic field of the magnetic conductive element 4 which is made of a magnetisable material, i.e. soft magnetic material, provides positioning or resetting of the induction magnet 1,130, to a preferred orientation, i.e. an orientation that enables maximum rotation and current generation in response to a subsequent passage of the one or more driving magnets, 2,2a,2b,111,112. The positioning or resetting of the induction magnet 1,130 due to magnetic interaction between the poles of the induction magnet and a pole 801 of the magnetic conducting structure is dependent on the magnetic field provided by the magnetic conducting structure. The magnetic field provided by the magnetic conducting structure is determined by the previous magnetisation of the structure, i.e. the magnetisation performed by the driving poles 2,2a,2b,111,112 or by a magnetisation performed by a current in the coil 3,140.

Fourth Detailed Description of an Embodiment

FIG. 10A illustrates an embodiment where the induction magnet 1 is asymmetrically hinged so that the induction magnet always positions in a preferred orientation relative to a magnetically conducting structure 1005 and core 1004 of the coil, which core and structure are in magnetically contact with the induction magnet 1.

The induction magnet 1 comprises first and second permanent magnets 1011,1012 and a magnetically conducting centre piece 1013 arranged between the first and second magnets. The centre piece has a through hole 1002 which constitutes a hinge axis. The hinge axis 1002 is located asymmetrically, i.e. displaced relative to a symmetry axis of the induction magnet, where the symmetry axis comprises any of the centre-axis of mass of the induction magnet and the centre-axis of magnetic strength, so that the induction magnet will always position in a given position. The first part 110 corresponds to previously described embodiments. The first part 110 is here illustrated with first and second driving magnets 2a, 2b; however, in this embodiment the first part may alternatively include only one driving magnet 2a since the asymmetrically hinging of the induction magnet may provide the required resetting or positioning of the induction magnet so that passage of a singe driving pole 111 generates maximum rotation of the induction magnet.

When the driving magnets 2a,2b or the first part 110 is sufficiently far away from the induction magnet 1, the induction magnet will take a position which is determined by the magnetic fields from the core 1004 and the magnetically conducting structure 1005 and the asymmetrically located hinge axis 1002, i.e. so that induction magnet takes a position which has the lowest magnetic resistance from the induction magnet to the magnetically conducting structure 1005 as illustrated in FIG. 10B.

FIG. 10C shows an embodiment wherein the magnets 1011,1012 of the asymmetric induction magnet 1 have different shapes, sizes and/or magnetic strength so that different interactions with the core 1004 and the magnetically conducting structure 1005 are obtained depending on the orientation of the induction magnet 1. In this way the induction magnet 1 can be configured to that it orients in a preferred orientation before passage, during passage and after passage of the one or more driving magnets.

Figure 11:
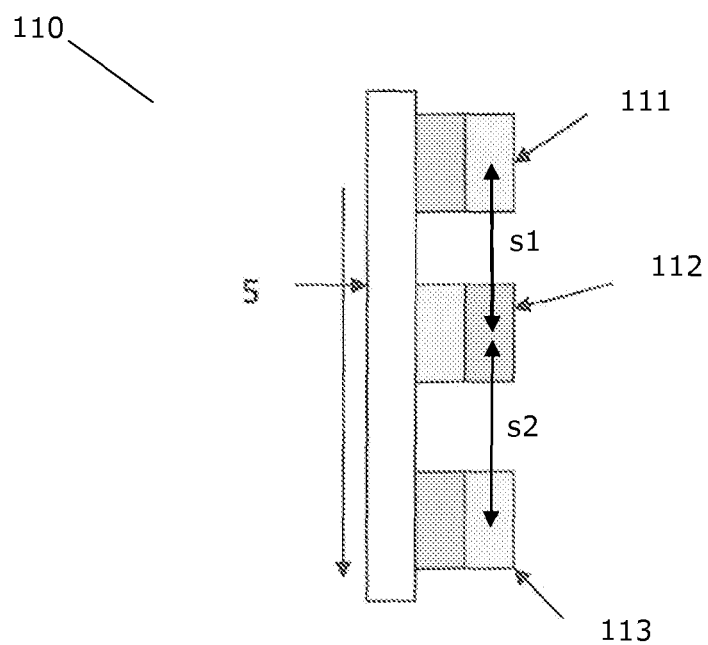
FIG. 11 shows that the distance between neighbour sets of driving magnets may be non-equal.

FIG. 11 shows an embodiment of the first part 110 comprising three driving poles or magnets 111-113 where the arc-length or distance s1, s2 between magnetic centres of adjacent driving poles are different. By use of more than two driving poles 111,112,113 and use of different distances between the driving poles, it is possible the obtain a design which determines how the induction magnet rotates at different speeds of the driving poles 111,112,113 and to smooth eigenfrequency points of the induction magnet.

The invention claimed is:

1. An induction generator for a vehicle for generating electric current, wherein the induction generator comprises first and second parts that are attachable to vehicle-parts, wherein one of the vehicle-parts is rotatably fixed relative to the other and, wherein:
the first part comprises first and second driving poles of opposite magnetic polarities,
the second part comprises an induction magnet with first and second induction poles of opposite magnetic polarities and a coil with windings of electrically conducting wire, wherein the induction magnet is rotatably arranged relative to the coil to enable induction of a current in the coil by motion of the magnetic poles, and
the first part is arranged on the moveable vehicle-part to enable the first and second poles of the first part to alternately face the induction magnet, upon motion of the vehicle-part, so as to move the induction magnet by magnetic interaction between the poles of the first part and the induction magnet, and wherein the first pole of the first part is provided at least to position or move the induction magnet before the second pole of the first part approaches the induction magnet.

2. The induction generator according to claim 1, wherein the first driving pole of the first part is provided at least to move the induction towards a position so that the second driving pole and the pole of the induction magnet, closest to the first part, have the same polarities when the second pole approaches the induction magnet.

3. The induction generator according to claim 1, wherein the induction magnet is rotatably arranged, and wherein the north and south poles of the induction magnet are angularly separated so that an approach of the second driving pole towards a pole of induction magnet will cause an angular rotation, by the angular separation or more, to a pole of opposite polarity of the induction magnet.

4. The induction generator according to claim 1, wherein the magnetic strength of the first driving pole is smaller than the strength of second driving pole.

5. The induction generator according to claim 1, wherein the rotation axis of the induction magnet deviates by an angle α relative to a plane perpendicular to the rotation axis of the rotatable vehicle-part.

6. The induction generator according to claim 1, wherein the arc length (s) between geometric centers of the first and second driving poles of the first part is equal to, or substantially equal to the arc length between magnetic centers of two poles of the induction magnet, so that motion of the first and second driving poles by an arc length (s) cause angular motion of the induction magnet by the same or substantially the same arc length (s) measured between magnetic centers of two poles of the induction magnet.

7. The induction generator according to claim 1, wherein the induction magnet is rotatably hinged and wherein the hinge axis is displaced from a symmetry axis of the induction magnet.

8. The induction generator according to claim 1, wherein the first part comprises at least three driving poles arranged with alternating magnetic polarities, and wherein the distance between magnetic centers of adjacent driving poles is non-constant.

9. A bicycle comprising the induction generator according to claim 1.

10. An induction generator for a vehicle for generating electric current, wherein the induction generator comprises first and second parts that are attachable to vehicle-parts, wherein one of the vehicle-parts is rotatably fixed relative to the other, and, wherein:
the first part comprises at least a first driving pole,
the second part comprises an induction magnet with first and second poles of opposite magnetic polarities, a coil with windings of electrically conducting wire and a magnetic conducting structure arranged relative to the first driving pole to be magnetized by the driving pole upon passage of the first driving pole, wherein the induction magnet is rotatably arranged relative to the coil to enable induction of a current in the coil by motion of the magnetic poles, and
the first part is arranged on the moveable vehicle-part to enable the at least first pole to face the induction magnet, upon motion of the vehicle-part, so as to move the induction magnet by magnetic interaction between the poles of the first part and the induction magnet, and wherein the magnetized magnetic conducting structure is further arranged relative to induction magnet to enable positioning or movement of the induction magnet in dependence of the magnetic polarity of the magnetic conducting structure.

11. The induction generator according to claim 10, wherein the rotation axis of the induction magnet deviates by an angle α relative to a plane perpendicular to the rotation axis of the rotatable vehicle-part.

12. The induction generator according to claim 10, wherein the magnetic conductive structure has one or more extremities, which are positioned relative to the induction magnet to enable a magnetically polarized pole of one of the one or more extremities to attract a pole of the induction magnet of opposite magnetic polarization.

13. The induction generator according to claim 10, wherein the magnetic conductive structure further comprises an extremity positioned relative to the driving pole to enable the driving pole to magnetize the magnetic conductive structure.

14. The induction generator according to claim 10, wherein the magnetic conductive structure is arranged to guide a magnetic flux from the induction magnet to the coil.

15. The induction generator according to claim 10, wherein the coil is wound on a part of the magnetic conductive structure.

16. The induction generator according to claim 10, wherein the induction magnet is rotatably hinged and wherein the hinge axis is displaced from a symmetry axis of the induction magnet.

17. The induction generator according to claim 10, wherein the first part comprises at least three driving poles arranged with alternating magnetic polarities, and wherein the distance between magnetic centers of adjacent driving poles is non-constant.

18. A method for generating electric current using an induction generator for a vehicle, wherein the generator comprises first and second parts that are attachable to vehicle-parts, wherein one of the vehicle-parts is rotatably fixed relative to the other, and wherein:
the first part comprises first and second driving poles of opposite magnetic polarities, and
the second part comprises an induction magnet with first and second poles of opposite magnetic polarities and a coil with windings of electrically conducting wire, wherein the induction magnet is rotatably arranged relative to the coil to enable induction of a current in the coil by motion of the magnetic poles, the method comprising:

fixing the first part on the moveable vehicle-part to enable the first and second poles of the first part to alternately face the induction magnet, upon motion of the vehicle-part, so that the first pole of the first part is able to at least position or move the induction magnet before the second pole of the first part approaches the induction magnet, and fixing the second part on the non-moveable vehicle-part so that the induction magnet can be moved by magnetic interaction between the poles of the first part and the induction magnet.

19. A method for generating electric current using an induction generator for a vehicle, wherein the generator comprises first and second parts that are attachable to vehicle-parts, wherein one of the vehicle-parts is rotatably fixed relative to the other, and wherein:

the first part comprises at least a first driving pole, the second part comprises an induction magnet with first and second poles of opposite magnetic polarities, a coil with windings of electrically conducting wire and a magnetic conducting structure arranged to be magnetized by the at least first driving pole upon passage of the first driving pole, where the induction magnet is rotatably arranged relative to the coil to enable induction of a current in the coil by motion of the magnetic poles, the method comprising:

fixing the first part on the moveable vehicle-part to enable the first pole of the first part to face the induction magnet, upon motion of the vehicle-part, and fixing the second part on the non-moveable vehicle-part so that the induction magnet can be moved by magnetic interaction between the pole of the first part and the poles of the induction magnet, and wherein, the magnetized magnetic conducting structure enables positioning or movement of the induction magnet in dependence of the magnetic field provided by the magnetic conducting structure.

* * * * *